United States Patent [19]

Ueki et al.

[11] Patent Number: 5,173,524
[45] Date of Patent: Dec. 22, 1992

[54] CONDUCTIVE POLYSULFONE RESINE COMPOSITION AND HIGH-HEAT-RESISTANT, CONDUCTIVE SEMI-CONDUCTOR ARTICLE MOLDED FROM SAME

[75] Inventors: Toru Ueki, Yokohama; Masaji Yoshimura, Yokohama; Susumu Kishi, Funabashi; Takashi Satoh, Yokohama, all of Japan

[73] Assignee: Mitsui Toatsu Chemicals, Incorporated, Tokyo, Japan

[21] Appl. No.: 680,735

[22] Filed: Apr. 5, 1991

[30] Foreign Application Priority Data

Apr. 13, 1990 [JP] Japan .................... 2-96498

[51] Int. Cl.⁵ .................................. C08K 3/04
[52] U.S. Cl. ......................... 524/496; 524/609
[58] Field of Search ..................... 524/496, 609

[56] References Cited

U.S. PATENT DOCUMENTS 4,690,778  9/1987  Narumiya et al. ............... 252/506
4,703,081  10/1987  Blackwell et al. ............... 524/496

FOREIGN PATENT DOCUMENTS 58-98362  6/1983  Japan .

OTHER PUBLICATIONS

Patent Abstracts of Japan, vol. 14, No. 86, Feb. 19, 1990, p. 111 C 690 Kokai No. 01-299 872.
Database WPIL, No. 87-141 008, Derwent Publications Inc. & JPA 62-81450.
Patent Abstracts of Japan, vol. 4, 129, Sept. 10, 1990, Kokai No. 55-82 130.

Primary Examiner—Paul R. Michl
Assistant Examiner—John J. Guarriello
Attorney, Agent, or Firm—Burns, Doane, Swecker & Mathis

[57] ABSTRACT

A conductive polysulfone resin composition which has excellent processability and is prepared by mixing (A) 100 parts by weight of a composition essentially consisting of from 5 to 95% by weight of an aromatic polysulfone resin and from 95 to 5% by weight of a polyphenylene sulfide resin with (B) from 3 to 40 parts by weight of conductive carbon, is provided by the present invention; and molded articles having excellent electrical conductivity, heat resistance and mechanical strength, for example, a high-heat-resistant, conductive semi-conductor-chip-carrier can be prepared from the composition by injection molding and other processing methods.

14 Claims, No Drawings

CONDUCTIVE POLYSULFONE RESINE COMPOSITION AND HIGH-HEAT-RESISTANT, CONDUCTIVE SEMI-CONDUCTOR ARTICLE MOLDED FROM SAME

BACKGROUND OF THE INVENTION a) Field of the Invention

The present invention relates to a conductive polysulfone resin composition which has improved electrical conductivity and is excellent in heat resistance, processability and mechanical strength, and a high-heat-resistant, conductive semi-conductor article molded from the composition.

b) Description of the Related Art

As a technique for providing electrical conductivity to an aromatic polysulfone resin, it has been disclosed, for example, in Japanese Laid-Open Patent 61670 (1978) a process for preparing an electrically conductive composite by the addition of conductive materials such as conductive carbon to the aromatic polysulfone resin. The invention describes that a composite having an electrical resistance of $10^{10}$ Ω or less can be prepared. In practice, however, the semi-conductor material thus obtained has a resistance of $10^7 - 10^{10}$ Ω. According to the information of the present inventors, a formulation of conductive carbon for providing conductivity to the aromatic polysulfone resin causes an increase in melt viscosity corresponding to the amount of addition. Consequently, kneading and molding of the molten composition becomes difficult or impossible in a formulating region capable of providing sufficient conductivity.

On the other hand, an injection molding resin composition containing conductive carbon dispersed in a polyphenylene sulfide resin has been known. Japanese Laid-Open Patent 8335 (1985) and 81450 (1987) disclose compositions containing conductive carbon having high oil absorption. However, the specific polyphenylene sulfide resin employed in the former patent is difficult to obtain uniform dispersion of conductive carbon and is not effective for furnishing electrical conductivity. Consequently, a remarkably increased amount of conductive carbon must be added in some uses. On the other hand, the latter patent describes that the amount of conductive carbon added can be decreased by using a polyphenylene sulfide resin having lower viscosity than that of the resin in the former patent. The latter patent, however, illustrates that the effect on conductivity improvement indicated by resistance is only $10^1$ Ω or at most $10^2$ Ω, value which is smaller than the addition effect of conventional conductive carbon.

Japanese Laid-Open Patent 98632.(1983) discloses a molding resin composition containing 100 parts by weight of a resin blend composed of 99 to 50% by weight of an aromatic polysulfone resin and 1 to 50% by weight of a polyphenylene sulfide resin and from 10 to 200 parts by weight, most preferably from 80 to 180 parts by weight of a filler. The filler which can be employed in the invention includes, for example, reinforcements such as glass fibers and carbon fibers, impact strength improvers such as graphite, heat resistance improvers such as antimony trioxide, electrical property improvers such as clay and mica, acid resistance improvers such as barium sulfate, and thermal conductivity improvers such as iron. Practical cases described in the examples are only the use of glass fiber or carbon fiber alone and the combined use of 80 parts of carbon fiber and 20 parts of graphite. No consideration is taken in the invention on the solution of a specific problem related to processing methods such as injection molding. Further, no disclosure is found at all on providing a molded article having excellent electrical conductivity.

Accompanied by high density packaging of electronic equipment, semi-conductors are mounted on a through-hole substrate in order to increase density. When moisture is adsorbed on semi-conductor parts, water vapor generates in the interior of the semi-conductor parts by heating with flow solder, leads to blistering or cracking and damages the semi-conductor. As a countermeasure, it has been required in the mounting to furnish a step for previously drying the semi-conductor at temperature of above 100° C to remove moisture. Conventionally, the semi-conductor drying step is carried out after once transferring the semi-conductor from a tray of conductive vinyl chloride resin or styrene base resin to a die-cast aluminum tray. The dried semi-conductor is delivered after transferring again to the above resin tray. Thus a complex step has been required. In order to simplify the step and to replace the expensive die-cast aluminum tray, application of a resin tray having excellent heat resistance is now under investigation.

Another mounting technique of the semi-conductor is a packaging method using tape automated bonding (TAB) in order to meet the demand for increased density and reduction in thickness. Application of resin parts called "carrier" is also under investigation for the transfer of the semi-conductor.

A heat resistant carrier composed of polypropylene resin has been used as a resin carrier having heat resistance of above 100° C. which is suitable for the object. Drying temperature is, however, liable to increase in order to reduce drying time of the semi-conductor. Drying is carried out at 130°to 150° C., sometimes at a high temperature of 175° C. Such a high temperature causes defective phenomena such as warpage and deformation and makes the semi-conductor useless. Nylon resin is also used due to higher heat resistance than polypropylene resin. A carrier composed of nylon resin has a high heat-shrinkage and leads to problems such as dimensional change of the carrier which renders automatic transfer with a robot impossible. Polyphenylene sulfide is a resin having a high heat resistance. Molding of carriers composed of the resin has, however, a problem of so-called "flash" known to those who are skilled in the art. Flash is a problem of generating on a molded article a surplus portion formed by squeezing-out and solidifying the resin through a parting line of the mold.

OBJECTS AND SUMMARY OF THE INVENTION

An object of the present invention is to provide a conductive polysulfone resin composition which has an improved electrical conductivity and is excellent in heat resistance, processability and mechanical strength.

Another object of the present invention is to provide a conductive polysulfone resin composition which has a good molding ability to give a molded article having particularly small warpage and deformation at high temperatures, is excellent in mechanical strength indicated by drop strength, and has a dominant geometric accuracy of moldings, that is, low generation of flash.

A further object of the present invention is to provide a high-heat-resistant, conductive article for semi-conductor by using the above conductive polysulfone resin composition.

The above objects of the present invention can be accomplished by providing a resin composition obtained by formulating an aromatic polysulfone resin, polyphenylene sulfide resin and conductive carbon in a specific proportion and melt-kneading the resultant mixture.

That is, one aspect of the invention is to provide a conductive resin composition obtained by mixing (A) 100 parts by weight of a composition essentially consisting of from 5 to 95% by weight of an aromatic polysulfone resin and from 95 to 5% by weight of a polyphenylene sulfide resin with (B) from 3 to 40 parts by weight of conductive carbon.

DETAILED DESCRIPTION OF THE INVENTION

The above conductive polysulfone resin composition of the present invention can be processed by various methods such as injection molding, extrusion and transfer molding. A preparation example of the high-heat-resistant, conductive semi-conductor-chip-carrier will hereinafter be illustrated as an application example by injection molding and as an example of the articles.

Particularly surprising in the invention is that the aromatic polysulfone resin composition of the invention is found to have a remarkably improved conductivity and additionally have a stabilized surface resistance as compared with an aromatic polysulfone resin composition or a polyphenylene sulfide resin composition individually obtained by adding the same amount of the conductive carbon as in the present invention.

The polyphenylene sulfide resin is assumed to have a much higher concentration of conductive carbon in the resin composition and to cause such characteristic. The resin composition of the invention can hence decrease the minimum amount of the conductive carbon required for obtaining electrical conductivity, can also depress the viscosity increase of the resin composition and has a characteristic of little flash in the molding step as compared with the polyphenylene sulfide resin.

The high-heat-resistant, conductive semi-conductor-articles molded by using the conductive polysulfone resin composition is suitable for parts, for example, IC-tray and chip-carrier for use in drying, transporting and inspection steps of semi-conductor production.

The term "high-heat-resistant, conductive semi-conductor article" in the present invention refers to containers, magazines, magazine-tubes, sockets for burn-in, racks, carriers, trays and other parts which are used in drying, transporting and inspection steps of semi-conductor production. The conductive chip-carrier in the articles is required to have surface resistance of from $10^5$ to $10^4$ Ω or less in order to inhibit static charge or to use in the inspection step.

The aromatic polysulfone resin which constitutes the conductive polysulfone resin composition of the invention is a polymer obtained by condensation reaction of an alkali phenolate group in an aprotic solvent with an aromatic halogen group which is activated by an electron attractive sulfonyl group and is a linear polymer having three required unit linkages of an arylene bond (aromatic bond), ether bond and sulfonyl bond.

The aromatic polysulfone resin can be prepared by the processes described in, for example, Japanese Patent Publication 10067 (1965), 7799 (1967) and 617 (1972). A representative commercial product is VICTOREX (Trade mark of Imperial Chemical Industries).

The aromatic polysulfone resin used in the invention has an inherent viscosity in a 1% dimethylformamide solution at 25° C. of preferably 0.38 dl/g or less, more preferably from 0.25 to 0.38 dl/g.

The polyphenylene sulfide resin (hereinafter referred to as PPS resin) for use in the invention is required to have 90% by mole or more of structural unit represented by the formula:

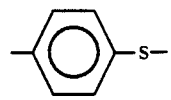

when the above structural unit is less than 90% by mole, excellent properties suitable for the objects of the invention are difficult to obtain. Copolymerization components including a metal bond such as

ether bond such as

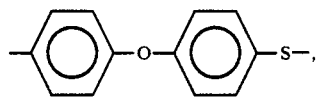

sulfonyl bond such as

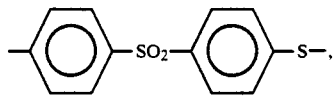

and biphenyl bond such as

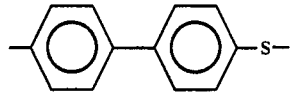

may be present in less than 10% by mole unless giving remarkably adverse effect on the crystallinity and stretch orientation of the polymer. The amount of the copolymerization components is preferably 5% by mole or less.

Polymerization of PPS can be carried out by reacting a halogen substituted aromatic compound with alkali metal sulfide [U.S. Pat. No. 2,513,188 and Japanese Patent Publication 3368 (1970)], by condensation reaction of thiophenols in the presence of an alkali catalyst [U.S. Pat. No. 3,274,165], and by condensation reaction of aromatic compounds with sulfur chloride in the presence of a Lewis acid catalyst [Japanese Patent Publication 27255 (1971)]. These processes can difficultly provide PPS of high polymerization degree and high polymer formation accompanied by crosslinking is usually carried out after polymerization. Consequently, these PPS are generally called crosslinking type PPS. The crosslinking type PPS which is available in the market includes RYTON P-6 (Trade mark of Phillips Petroleum).

Polymerization of PPS can also be carried out in the presence of oxide or hydroxide of alkaline earth metals to obtain straight chain polymers of high molecular weight [Japanese Laid-Open Patent 55029 (1985) and 55030 (1985)]. PPS prepared by these processes is generally called straight chain PPS. Marketed straight chain PPS includes FORTRON W-205 (Trade mark of Kureha Chemical Industry). Both crosslinking type and straight chain type PPS resins can be used for the PPS resin of the invention.

The conductive carbon used for the invention is filled into the resin, provides a high electrical conductivity for the resin and remarkably reduces surface resistance of the resin.

Exemplary conductive carbon includes furnace black, channel black, lamp black, acetylene black and thermal black, and, in particular, acetylene black and furnace black are preferably used. Graphite and carbon fiber are unsuitable for the conductive carbon of the invention. The conductive carbon may be used singly or as a mixture. Marketed furnace black includes, for example, KETJEN BLACK EC (Trade mark of Akzo in Holland) and VULCAN XC-72 (Trade mark of Cabot in USA).

Electrical conductivity can be sufficiently provided in the invention by formulating conductive carbon in the resin composition. Other conductive fillers can also be added depending upon the object of conductivity increase. Other conductive fillers include, for example, a single materials or a mixture of the material selected from silver, copper, gold, aluminum, nickel, palladium, iron, stainless steel, tin oxide, indium oxide, lead oxide, silicon carbide, zirconium carbide, titanium carbide, graphite carbon fiber or metallic fiber; or powder, flake, bead, fiber or other various materials obtained by coating these conductive fillers.

In the present invention, the formulating ratio of the aromatic polysulfone resin to the polyphenylene sulfide resin is from 5 to 95% by weight of the aromatic polysulfone resin to from 95 to 5% by weight of the polyphenylene sulfide resin. The formulating ratio of a resin which provides very excellent heat resistance and electrical conductivity is preferably from 60 to 95% by weight of the aromatic polysulfone resin to from 40 to 5% by weight of the polyphenylene sulfide resin, more preferably from 70 to 90% by weight of the aromatic polysulfone resin to from 30 to 10% by weight of the polyphenylene sulfide resin. The formulating ratio of the resin which provides very excellent processability is preferably from 5 to 60% by weight of the aromatic polysulfone resin to from 95 to 40% by weight of the polyphenylene sulfide resin, more preferably from 10 to 50% by weight of the aromatic polysulfone resin to from 90 to 50% by weight of the polyphenylene sulfide resin. To 100 parts by weight of the resin composition (A), the conductive carbon (B) is added in an amount of from 3 to 40 parts by weight, preferably from 3 to 25 parts by weight. An amount of aromatic polysulfone resin less than 5% by weight causes marked reduction of heat resistance and is additionally liable to generate flash on conductive articles. On the other hand, an amount of aromatic polysulfone resin exceeding 95% by weight decreases processing ability and further leads to unstable surface resistivity. An amount of conductive carbon less than 3 parts by weight results in insufficient electrical conductivity. On the other hand, an amount of the carbon exceeding 40 parts by weight lowers flowability and mechanical strength of the composition and good molded articles become difficult to obtain.

No particular restriction is imposed and usually known processes can be used on the preparation process of the high-heat-resistant, conductive semi-conductor-articles of the invention. In the preparation process, the aromatic polysulfone resin, polyphenylene sulfide resin, conductive carbon and, if desired, other materials and additives are uniformly mixed with a high speed stirrer. The resulting mixture is melt-kneaded with a single or multi screw extruder having sufficient capacity, pelletized and then injection molded to obtain the articles.

Various elastomers can be added to further improve mechanical strength of the resin composition and the high-heat-resistant, conductive semi-conductor-articles.

The elastomers which can be used are A-B-A' type block copolymer elastomers. A and A' are polymerized vinyl aromatic hydrocarbon blocks and B is a polymerized, conjugated diene block or a block obtained by hydrogenating the polymerized, conjugated diene block. A glycidyl group containing copolymer composed of $\alpha$-olefin and $\alpha,\beta$-unsaturated carboxylic acid glycidyl ester, a core-shell type elastomer and a polyester elastomer can also be added for the same object. The elastomers may be used singly or as a mixture. The elastomers can be added in an amount which causes no remarkable reduction in heat resistance of the conductive polysulfone resin composition. The amount is preferably from 0.5 to 30 parts by weight, more preferably from 1 to 20 parts by weight per 100 parts by weight of the composition (A).

Additives which can be incorporated depending upon the object are pigments and dyes, fillers such as glass fiber, talc and calcium carbonate, stabilizers such as calcium stearate, bleaching agents such as hydrosulfite, antioxidants, ultraviolet absorbers, lubricants, release agents such as fluoro resin and silicon resin, flame retardants, and antistatics. The amount of additives except fillers and other elastomers is preferably from 3 to 50 parts by weight, more preferably from 5 to 30 parts by weight per 100 parts by weight of the composition (A).

The conductive polysulfone resin composition of the invention is excellent in electrical conductivity, has good processability, heat resistance and mechanical strength and consequently is high in practical value. The high-heat-resistant, conductive semi-conductor-articles molded from the conductive polysulfone resin composition have a large value in practical use due to excellent electrical conductivity, little flash in the molding step, and additionally excellent heat resistance and mechanical strength.

The present invention will hereinafter be illustrated further in detail by way of examples. The properties of the resin compositions and molded articles in the examples and comparative examples were evaluated by the following methods.

(1) Tensile strength

In accordance with JIS-K 7113.

(2) Heat distortion temperature

In accordance with JIS-K 7207 at a bending stress of 18.56 kg/cm$^2$.

(3) Melt flow index (processability)

In accordance with JIS K-7210, under 10 kg load at 320° C.

(4) Surface resistivity

A two terminal type surface resistivity tester (RESISTAT; manufactured by Mitsubishi Petrochemical) was used.

A dumbbell specimen used for the tensile strength test and a specimen cut from the molded carrier (molded article) were respectively used for measuring surface resistivity at 23° C. in 50% relative humidity.

(5) Warpage and deformation of molded article (carrier)

A tray having dimensions of 300×150×6 mm, an average thickness in the flat portion of 2.5 mm and a total weight of 80 g was injection molded, allowed to stand in a drying oven at 175° C. for 2 hours, placed on a flat plate and the presence of warpage and deformation was visually observed.

(6) Mechanical strength of molded article

A molded article was gravity-dropped from a height of 2 m on a concrete floor and damage was visually observed.

(7) Flash of molded articles

A molded article was observed with a magnifier and the presence of flash was observed.

EXAMPLES 1-5

An aromatic polysulfone resin VICTOREX 3600P (manufactured by Imperial Chemical Industries), a polyphenylene sulfide resin RYTON P-6 (manufactured by Phillips Petroleum) and conductive carbon KETJEN BLACK EC (manufactured by Akzo in Holland) having dibutyl phthalate oil absorption of 360 ml/100 g were formulated in a proportion illustrated in Table 1, kneaded in a temperature range of 270° to 330° C. to prepare pellets. The pellets thus obtained were injection molded to form specimens and chip carriers. The evaluation results of properties are illustrated in Table 1.

Injection molding was carried out under mold clamping force of 150 tons at a cylinder temperature of 360° C. and a mold temperature of 150° C.

EXAMPLE 6

The same procedures as described in Example 1 were carried out except that methyl methacrylate/butadiene/styrene graft copolymer KM653 (Trade mark of Rohm & Haas Company) was used as a core-shell type elastomer and formulated in a proportion illustrated in Table 1.

EXAMPLE 7

The same procedures as described in Example 6 were carried out except that ethylene/glycidyl methacrylate copolymer BONDFAST 2B (Trade mark of Sumitomo Chemical Industry) (illustrated as EGMA in Table 1) was used as an elastomer and formulated in a proportion illustrated in Table 1.

EXAMPLE 8

The same procedures as described in Example 3 were carried out except that glass fiber ESC T-24 (Trade mark of Nippon Electric Glass) (illustrated as GF in Table 1) was used and formulated in a proportion illustrated in Table 1.

COMPARATIVE EXAMPLES 1-4

The same procedures as described in Examples 1-4 were carried out except that the proportion of components in the formulations were changed as illustrated in Table 2.

When the proportion of components deviates from the specified formulating ratio, the resin compositions experience a remarkable decrease in one or more of heat distortion temperature, melt flow index, tensile strength and surface resistivity, and the molded articles lead to generation of warpage or flash and marked lowering of mechanical strength and surface resistivity. Thus the molded articles were found to be unsatisfactory for practical use.

COMPARATIVE EXAMPLE 5

The same procedures as described in Example 3 were carried out except that graphite was used in place of KETJEN black EC. The composition obtained had insufficient physical properties. The molded article is also inferior in mechanical strengths and surface resistivity. Thus the composition was unsuitable for practical use.

TABLE 1

| | | Example No. | | | | | | | |
|---|---|---|---|---|---|---|---|---|---|
| | | 1 | 2 | 3 | 4 | 5 | 6 | 7 | 8 |
| Formulation | | | | | | | | | |
| (A) | Aromatic polysulfone resin (% by weight) | 20 | 40 | 70 | 70 | 90 | 70 | 90 | 70 |
| | Polyphenylene sulfide resin (% by weight) | 80 | 60 | 30 | 30 | 10 | 30 | 10 | 30 |
| (B) | Conductive carbon (parts by weight) | 8 | 8 | 8 | 20 | 8 | 5 | 10 | 4 |
| | Elastomer (parts by weight) | | | | | | Core shell 5 | EGMA 10 | |
| | Glass fiber (parts by weight) | | | | | | | | GF 10 |
| Property of composition | | | | | | | | | |
| Tensile strength (kg/cm$^2$) | | 430 | 440 | 510 | 460 | 550 | 570 | 550 | 810 |
| Heat distortion temperature (°C.) | | 183 | 189 | 203 | 209 | 209 | 192 | 201 | 214 |
| Melt flow index (g/10 min) | | 42 | 38 | 33 | 28 | 28 | 31 | 27 | 27 |
| Surface resistivity (Ω) | | $1 \times 10^3$ | $3 \times 10^3$ | $3 \times 10^3$ | $7 \times 10^2$ | $2 \times 10^3$ | $5 \times 10^3$ | $4 \times 10^3$ | $1 \times 10^4$ |
| Property of molded article | | | | | | | | | |
| Warpage and deformation | | no | no | no | no | no | no | no | no |
| Mechanical strength | | good | good | good | good | good | good | good | good |

TABLE 1-continued

|  | Example No. | | | | | | | |
| --- | --- | --- | --- | --- | --- | --- | --- | --- |
|  | 1 | 2 | 3 | 4 | 5 | 6 | 7 | 8 |
| Surface resistivity ($\Omega$) | $1 \times 10^4$ | $8 \times 10^3$ | $7 \times 10^3$ | $1 \times 10^3$ | $8 \times 10^3$ | $9 \times 10^3$ | $7 \times 10^3$ | $5 \times 10^4$ |
| Flash (Geometrical accuracy) | no | no | no | no | no | no | no | no |

TABLE 2

|  |  | Comparative Example No. | | | | |
| --- | --- | --- | --- | --- | --- | --- |
|  |  | 1 | 2 | 3 | 4 | 5 |
| Formulation | | | | | | |
| (A) | Aromatic polysulfone resin (% by weight) | 100 | 2 | 70 | 70 | 70 |
|  | Polyphenylene sulfide resin (% by weight) | 0 | 98 | 30 | 30 | 30 |
| (B) | Conductive carbon (parts by weight) Elastomer (parts by weight) Glass fiber (parts by weight) | 8 | 8 | 1 | 50 | Graphite 8 |
| Property of composition | | | | | | |
| Tensile strength (kg/cm$^2$) | | 550 | 480 | 620 | 430 | 480 |
| Heat distortion temperature (°C.) | | 212 | 117 | 201 | 210 | 204 |
| Melt flow index (g/10 min) | | 16 | 31 | 23 | 13 | 25 |
| Surface resistivity ($\Omega$) | | $1 \times 10^8$ | $3 \times 10^7$ | $>10^{14}$ | $6 \times 10^3$ | $4 \times 10^7$ |
| Property of molded article | | | | | | |
| Warpage and deformation | | no | found | no | no | no |
| Mechanical strength | | good | good | good | crack | good |
| Surface resistivity ($\Omega$) | | $2 \times 10^8$ | $5 \times 10^7$ | $>10^{14}$ | $7 \times 10^3$ | $8 \times 10^7$ |
| Flash (Geometrical accuracy) | | no | found | no | no | no |

What is claimed is:

1. A conductive polysulfone resin composition comprising a mixture of (A) 100 parts by weight of a composition consisting essentially of from 5 to 95% by weight of an aromatic polysulfone resin and from 95 to 5% by weight of a polyphenylene sulfide resin and (B) from 3 to 40 parts by weight of conductive carbon selected from the group consisting of furnace black, channel black, lamp black, acetylene black, thermal black and mixtures thereof.

2. The resin composition of claim 1 wherein (A) 100 parts by weight of the composition essentially consisting of from 20 to 95% by weight of the aromatic polysulfone resin and 80 to 5% by weight of the polyphenylene sulfide resin are mixed with (B) from 3 to 25 parts by weight of the conductive carbon.

3. The resin composition of claim 1 wherein (A) 100 parts by weight of the composition essentially consisting of from 60 to 95% by weight of the aromatic polysulfone resin and from 40 to 5% by weight of the polyphenylene sulfide resin are mixed with (B) from 3 to 25 parts by weight of the conductive carbon.

4. The resin composition of claim 1 wherein (A) 100 parts by weight of the composition essentially consisting of from 5 to 60% by weight of the aromatic polysulfone resin and from 95 to 40% by weight of the polyphenylene sulfide resin are mixed with (B) from 3 to 25 parts by weight of the conductive carbon.

5. The resin composition of claim 1 wherein the aromatic polysulfone resin has an inherent viscosity of 0.38 dl/g or less at 25° C. in a 1% dimethylformamide solution.

6. The resin composition of claim 1 wherein the polyphenylene sulfide resin comprises 90% by mole or more of the structural units represented by the formula:

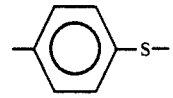

7. The resin composition of claim 1 wherein the polyphenylene sulfide is a straight chain type polyphenylene sulfide resin.

8. The resin composition of claim 1 wherein the conductive carbon is acetylene black or furnace black.

9. The resin composition of claim 1 wherein an elastomer is added in an amount of from 0.5 to 30 parts by weight per 100 parts by weight of the resin composition (A).

10. The resin composition of claim 9 wherein the elastomer is a core-shell type elastomer.

11. The resin composition of claim 9 wherein the elastomer is a glycidyl group containing copolymer composed of $\alpha$-olefin and $\alpha,\beta$-unsaturated glycidyl ester.

12. The resin composition of claim 1 wherein the amount of a filler and other additives excluding the elastomer is in the range of from 5 to 30 parts by weight per 100 parts by weight of the resin composition (A).

13. A molded article obtained by molding a conductive polysulfone resin composition comprising mixing (A) 100 parts by weight of a composition essentially consisting of from 5 to 95% by weight of an aromatic polysulfone resin and from 95 to 5% by weight of a polyphenylene sulfide resin with (B) from 3 to 40 parts by weight of conductive carbon.

14. A molded article of high-heat-resistant, conductive semi-conductor-chip-carrier of claim 13.

* * * * *